United States Patent [19]

Segal et al.

[11] Patent Number: 5,418,961

[45] Date of Patent: May 23, 1995

[54] PARALLEL TABLES FOR DATA MODEL WITH INHERITANCE

[75] Inventors: Richard L. Segal, Yorktown Heights; James H. Kukula, Delhi, both of N.Y.

[73] Assignee: International Business Machines Corporation, Armonk, N.Y.

[21] Appl. No.: 3,175

[22] Filed: Jan. 12, 1993

[51] Int. Cl.⁶ .................................... G06F 12/02
[52] U.S. Cl. ...................... 395/700; 364/DIG. 1; 364/254.6
[58] Field of Search ..................................... 395/700

[56] References Cited

U.S. PATENT DOCUMENTS

5,291,583  3/1994  Bapat .................................... 395/500

*Primary Examiner*—Thomas M. Heckler
*Attorney, Agent, or Firm*—Lawrence D. Cutter; Kevin P. Radigan

[57] ABSTRACT

A parallel tables structure and method of implementation for an object-oriented data model are presented. The novel structure includes a plurality of memory tables separate from but associated with the object-oriented data model. Level-relative indices are initially arbitrarily assigned to each category such that an object in a particular category receives only one index for each supercategory in the object-oriented data model. These level-relative indices are used to locate a particular table in the plurality of memory tables which contains, for example, an attribute value (or relation) for an object in that category. The object's own index is used to retrieve the attribute value from the identified memory table.

14 Claims, 8 Drawing Sheets

PARALLEL TABLES FOR DATA MODEL WITH INHERITANCE

TECHNICAL FIELD

This invention relates in general to data models with inheritance such as object-oriented models and, more particularly, to a technique for efficiently defining, storing and locating attribute values of objects defined by entities in such a model so that: (1) object attribute definitions can be dynamically added/deleted without necessitating a recompilation of the object-oriented data model; and (2) memory allocated for attribute values need include no space beyond that demanded by the attribute values structures themselves as required by their category hierarchy.

BACKGROUND ART

Application programs for complex interrelated data and high performance requirements, such as computer aided design (CAD) and computer aided software engineering (CASE), frequently use a collection of "objects" to represent data of interest. Such applications attach various "attributes" to these objects in order to record the characteristics (or "attribute values") of the objects. The mechanism used to maintain the attributes of a data model seeks to satisfy the following requirements: (1) an attribute value for a particular object must be quickly accessible; (2) storage requirements to maintain the attributes should be minimized; and (3) the application must be able to dynamically add and remove "attribute values". (In any object-oriented data model, "attribute values" must be changeable.)

Figure 1:
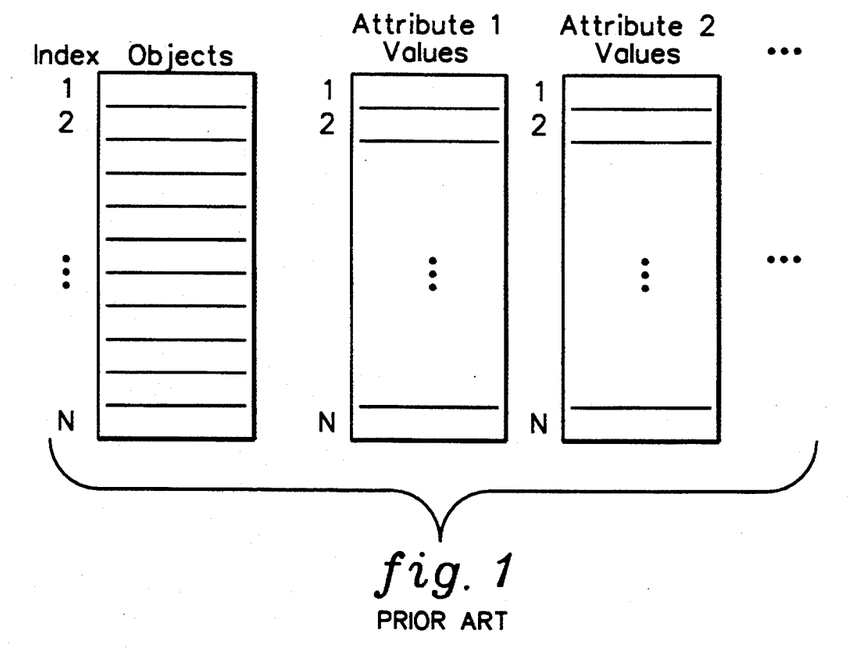
FIG. 1 is an example of attribute values maintained in "parallel tables;"

A first classical mechanism used by many commercially available data models is to maintain attribute values in "parallel tables" (see FIG. 1). In a parallel tables configuration, each object of a "category" is assigned a unique integer index (1,2, . . . N) and "attribute values" are held in a memory array comprised of equal length attribute tables (e.g., Attribute 1 Values table, Attribute 2 Values table, etc.) The array element at an object's index comprises the attribute value for that object. Thus, each attribute is assigned its own table within the data model. Accessing an attribute value involves simply indexing into the appropriate array using the object's index (1,2, . . . N). The array holds just attribute values, with no extra storage costs for linked lists, hash tables, etc. Whenever a new attribute is to be added or removed, the array which holds the attribute values must be allocated or deallocated, so the requirement for dynamism is satisfied. A significant problem with this approach, however, is that space is allocated for all objects, even if they might not need the attribute.

This problem with the parallel tables approach arises from the scope of uniqueness of object indices. Generally, objects used via application programs are "categorized". For example, in an electronic design automation program, categories such as Block, Net, and Pin are frequency used. Generally, a particular type of attribute applies to only one or a few categories. By way of example, "Pin elevation" is an attribute of Pins, and "Block function" is an attribute of Blocks. If every object is given a unique index, then space in the Block function table must be allocated for every Pin object, even though Pins do not have any Block function to be recorded. Obviously, this can comprise a significant waste of memory space.

Figure 2:
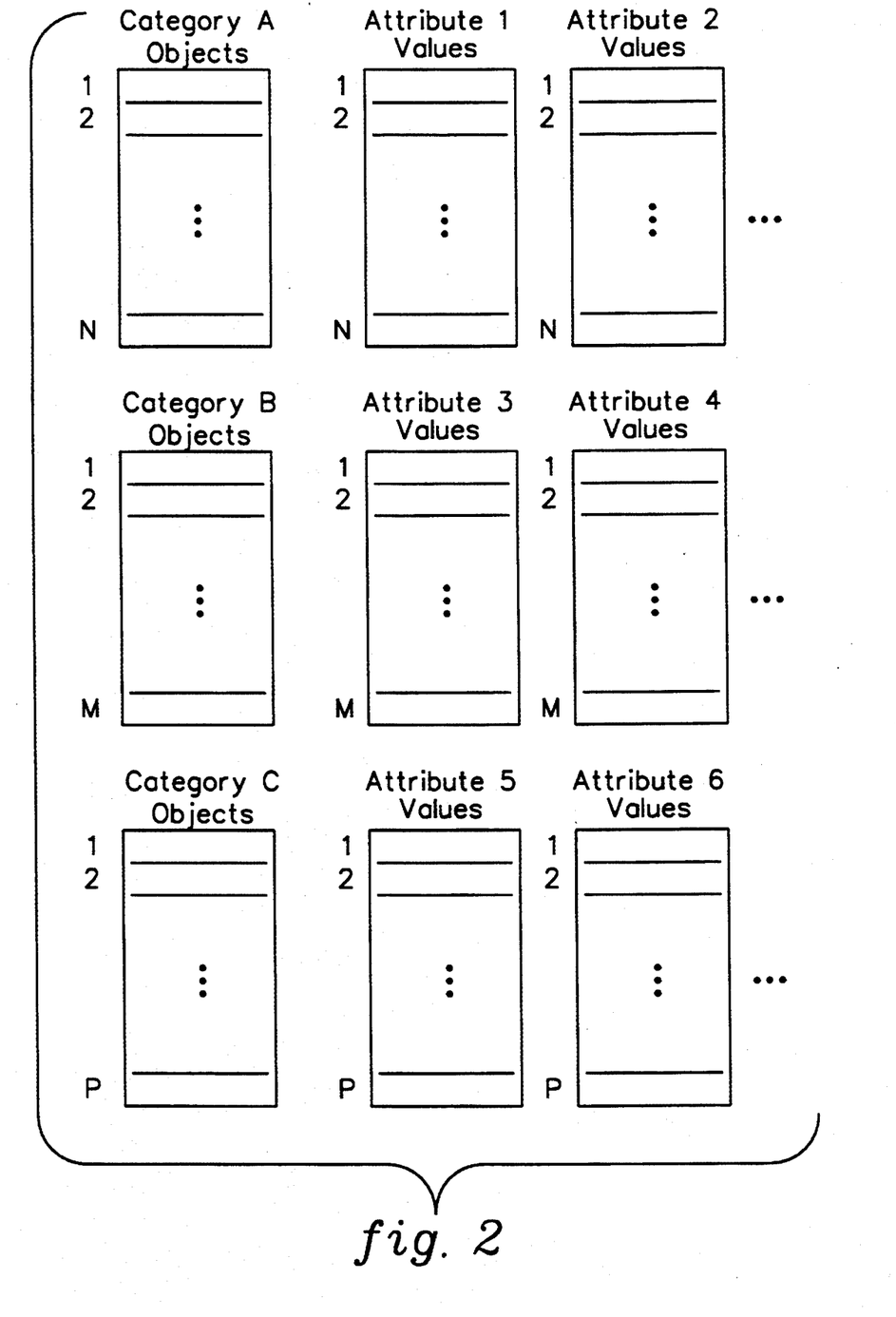
FIG. 2 is an example of a parallel tables implementation for multiple object categories.

A simple solution to the problem might be to limit the scope or uniqueness of the object indices to a category. Thus, no two Block objects would have the same index, but a Block and a Pin might have the same index. No relationship would be implied by objects in different categories having the same indices; the indices in different categories would be completely independent. As indices would be bound to categories, so would attributes be bound to categories. Each attribute would be associated with a category and be maintained in a table (array) which would be indexed by the object indices of that category. By way of example, see FIG. 2 wherein category A objects have associated attribute 1 & 2 values, category B objects have associated attribute 3 & 4 values, and category C objects have associated attribute 5 & 6 values.

Unfortunately, the situation is further complicated when hierarchical relationships are established between "categories". In particular, some applications require only a very course categorization of "objects" for example dividing objects into just Blocks, Nets, and Pins. In such applications, there may be a need to access attributes associated with the general categories. In contrast, other applications may require a much finer categorization of objects. For example, there may be TIBBlocks, CMOSBlocks, MacroBlocks, ChipBlocks, etc. Unique attribute information may need to be associated with each of these object categories.

Figure 3:
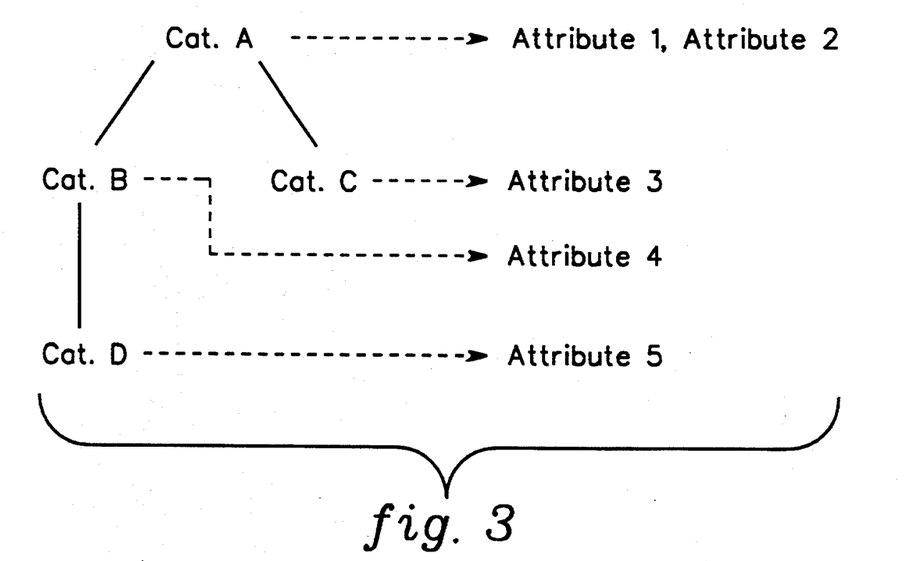
FIG. 3 is an example of a data model with inheritance, each category of which has at least one attribute associated therewith.

In order to support the various granularities of categorization required by different applications, object-oriented models permit categories to be organized hierarchically (see FIG. 3). Each "category" may be related to another category as its "supercategory." Even though an object belongs to one particular category, an application which prefers a relatively course granularity structure can treat the "object" as if it were a member of that category's "supercategory", or even that "supercategory's" "supercategory", etc.

The processing mechanism disclosed herein provides an efficient technique for locating one of multiple parallel tables maintained separate from but in association with categories of an object-oriented data model so that attribute values for objects within the categories can be accessed, while minimizing waste of memory space.

DISCLOSURE OF INVENTION

In order that space may be allocated for "attribute values" only for those "objects" for which an attribute value is required, object indices should be unique within the finest categorization of objects. So that each object can have a unique attribute value, a separate parallel table must be built for each "category" of "objects" with which an "attribute" is to be associated. When an application requires access to the attribute value for a particular object, the appropriate parallel table must be located.

Figure 4:
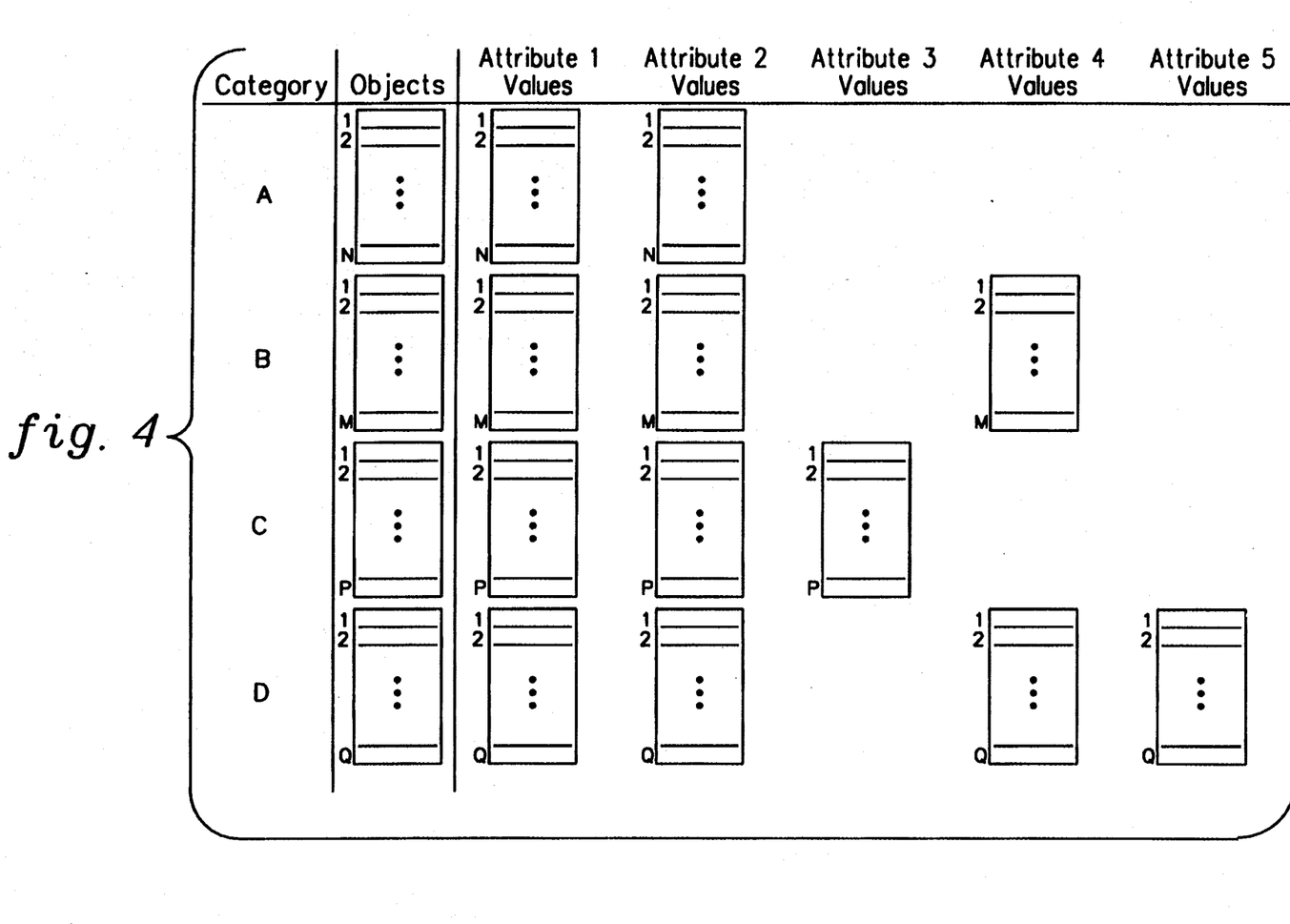
FIG. 4 depicts a parallel tables concept pursuant to the present invention for a hierarchical data model such as that depicted in FIG. 3.

By way of example, in FIG. 3 attributes 1 & 2 are defined for supercategory A, attribute 3 for category C, attribute 4 for category B and attribute 5 for category D. FIG. 4 depicts the attribute values tables needed for each category in the hierarchical arrangement of categories A-D of FIG. 3 (wherein category A is assumed to have N objects, category B to have M objects, category C to have P objects and category D to have Q objects). As shown, attribute 1 & 2 values are associated with category A, attribute 1, 2 & 4 values are associated with category B, attribute 1, 2 & 3 values are associated with category C and attribute 1, 2, 4 & 5 values are associated with category D.

One approach to locating parallel tables involves assigning a unique "index" to each "category". An "attribute definition" object is required to hold an "array of pointers" to the various parallel tables in which the attribute's values are maintained. This "array of pointers" is indexed by the category indices. When the "attribute value" for an object is to be accessed, the index of the object's category is used to find the proper parallel table, and the index of the object is used to find the attribute value in this parallel table.

Such a "category index" mechanism is fast, but may consume memory space. In particular, since most attributes do not apply to most categories the array of parallel table pointers kept by each category may be mostly empty space. For example, in a large system having 1000 categories and 10,000 attributes, the set of parallel table pointers will require 40 Megabytes. However, each attribute generally only applies to a few categories, so that over 99% of this space might be wasted. The hierarchical parallel tables approach of the present invention also addresses this issue.

Briefly summarized, the present invention comprises in one aspect a memory table structure for an object-oriented data model having multiple categories arranged in a hierarchical structure such that a supercategory is defined having a sub-category. The supercategory has an attribute associated therewith such that attribute values exist for said supercategory and for its sub-category. The memory table structure includes multiple memory tables located separate from but in association with the multiple categories for retaining the attribute's values. A first memory table is associated with the supercategory for retaining attribute values of the attribute associated with the supercategory and a second memory table is associated with the sub-category for retaining attribute values therefore of the attribute associated with the supercategory. A set of unique level-relative indices is provided such that the supercategory and the sub-category have a first level-relative index and a second level-relative index, respectively, for accessing their associated first memory table and second memory table.

In a more detailed embodiment, the memory table structure pursuant to the present invention includes a first level array associated with the supercategory and a second level array associated with the sub-category. The first and second level arrays each contain level-relative indices for the supercategory and the subcategory, respectively. These level-relative indices are arbitrarily assigned and unique for the attribute associated with the supercategory. The memory table structure also includes an attribute table associated with the supercategory's attribute. This attribute table contains pointers for the supercategory and the sub-category to specific ones of multiple memory tables (which are separate from but associated with the multiple categories forming the object-oriented data model). The level-relative indices include indices into the attribute table for the supercategory and the sub-category to locate specific pointers within the attribute table to the corresponding memory tables. A corresponding addressed memory table contains the attribute values of the supercategory's attribute for the supercategory or for the sub-category.

In yet another aspect, the present invention provides a method for locating an attribute value for an object from a parallel table structure associated with an object-oriented data model. The object-oriented model includes multiple categories arranged in a hierarchical structure such that a supercategory is defined having a sub-category. The supercategory has an attribute associated therewith such that attribute values exist for the supercategory and for the sub-category. The method locates an attribute value for an object within the sub-category of the attribute associated with the supercategory. The parallel table structure includes an attribute table for the supercategory's attribute and multiple memory tables separate from but associated with the object-oriented data model's multiple categories. The attribute table contains memory table pointers for the supercategory and the sub-category specific to the supercategory's attribute for locating a corresponding one of the multiple memory tables. The attribute value locating method includes the steps of: identifying an assigned level-relative index of said sub-category for the attribute associated with said supercategory; employing the level-relative index for the sub-category to index into the attribute table associated with the supercategory's attribute and locate a corresponding memory table pointer; and using the corresponding memory table pointer to identify a corresponding one of the multiple memory tables containing attribute values for the sub-category of the attribute associated with the supercategory.

To summarize, the data structures and methods described herein provide a compact and fast dynamic attribute recording mechanism for an object-oriented environment. Attributes (and relations) can be associated with any category and rapidly accessed for any object within that category or for any of its direct or indirect sub-categories. The presented hierarchical parallel tables approach allows access to attribute values with a fixed, small number of instructions and improves efficiency by avoiding loss of space in the various arrays. The technique is independent of the specific object-oriented model and of the structure of the attribute values themselves. Further, attributes may be elementary primitive values, such as integers, or more complex structures, including even collections of relationships with other objects.

BRIEF DESCRIPTION OF DRAWINGS

These and other objects, advantages and features of the present invention will be more readily understood from the following detailed description of certain preferred embodiments of the present invention, when considered in conjunction with the accompanying drawings in which.

BEST MODE FOR CARRYING OUT THE INVENTION

A key component of an object-oriented paradigm is the use of reusable elements, referred to as "classes." A class includes members of specified data types and a set of operations which can be performed on those members. An "object" is an "instance" of a "class" (or "category"), which is a user defined data type. (As used herein, "category" is to be read as synonymous with "class".) Object-oriented database management systems employing the object-oriented paradigm are designed for applications with complex interrelated data and very high performance requirements. As noted above, examples of such applications are computer aided design (CAD) and computer aided software engineering (CASE). Typically, object-oriented database management systems support object-oriented data models.

Object-oriented data models are models for data using the object-oriented paradigm. In an object-oriented data model, the data structures are encapsulated so that access to and manipulation of data is possible only through well-defined interfaces. Such a model is generally implemented using an object-oriented programming language, such as, for example, C++ (see *The annotated C++ Reference Manual,* by Margaret A. Ellis and Bjourne Stroustrup, Addison-Wesley, 1990). Object-oriented data models generally provide for inheritance, which refers to the ability to define sub-categories in a hierarchical relationship. In order to navigate through the data of an object-oriented data model, "relations" are employed. ("Navigate" refers to the addressability of objects from other objects and the changing of paths (relationships) through which the addressability is obtained.) The inventive approach described herein is equally applicable to relations and to attributes. As used herein, the terms "attribute" and "attribute values" are to be broadly read as encompassing relations. (A secondary benefit of the present invention is that sub-categories may be dynamically added/deleted as well.)

Figure 5:
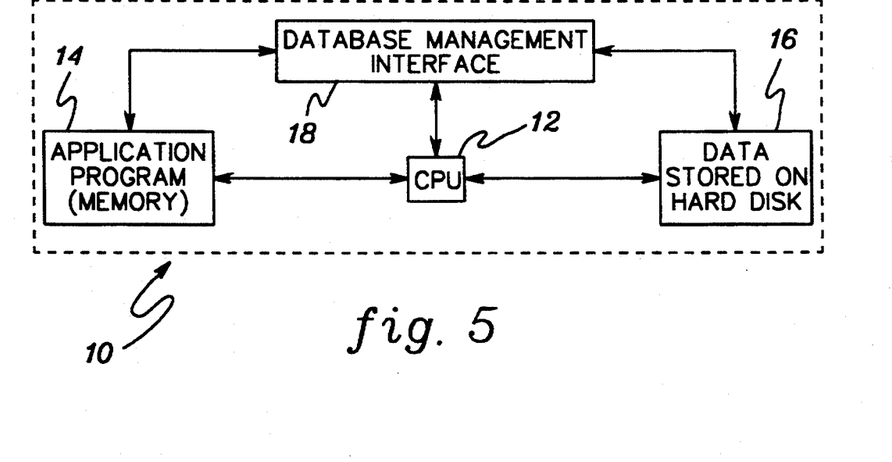
FIG. 5 is a block diagram of one embodiment of a data processing system employing a hierarchical parallel tables structure pursuant to the present invention.

Further, as used herein, "parallel table(s)" refers to sets of memory tables or memory arrays, which may be of different length. These memory tables contain "attribute values" and are indexed in order that the "attribute values" may be retrieved. FIG. 5 depicts an example of a data processing system, generally denoted 10, which may employ the hierarchical parallel tables concept of the present invention. System 10 includes, for example, one or more central processing units (CPUs) 12, an application program memory 14, and a main data memory 16, which may comprise hard disk memory storage. A database management interface 18 coordinates the flow of instructions and data between CPU 12, program memory 14 and data storage 16. An object-oriented data model and parallel tables structure pursuant to the present invention would typically reside within, or be readily available to,. interface 18.

In general, for each attribute, the hierarchical parallel tables approach of the present invention assigns to each category of the corresponding hierarchical data structure a set of "level-relative indices." In practice, these level-relative indices are used to find the parallel table which contains the "attribute values" for "objects" in that "category." The level-relative indices are arbitrarily assigned for each particular category such that each category receives only one index for each of its super-categories in the hierarchical data structure.

Figure 6:
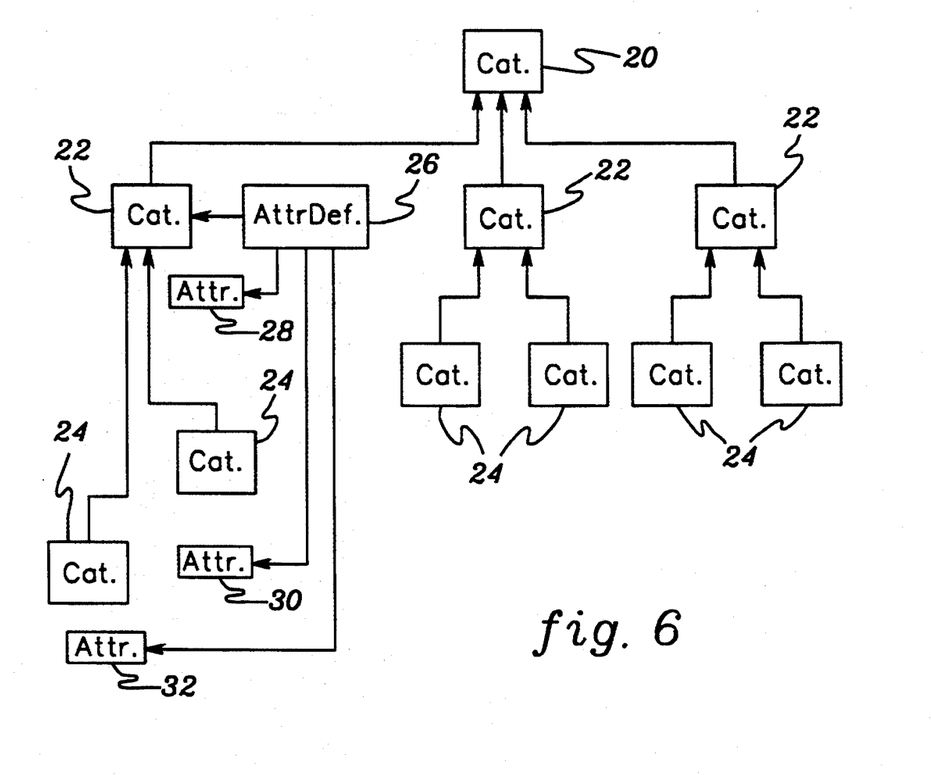
FIG. 6 is an example of a data model with inheritance which may employ a parallel tables structure pursuant to the present invention.

"Level" is used herein to refer to a depth in a category hierarchy. Categories that have no supercategory are at "level 1," while a category is at "level N+1" if its supercategory is at "level N". For example, FIG. 6 depicts a sample data structure hierarchy wherein category 20 is at "level 1," categories 22 are at "level 2" and categories 24 are at "level 3." Category 20 comprises a supercategory having "direct" sub-categories 22 and "indirect" sub-categories 24, or stated another way, categories 24 have immediate supercategories 22 and a remote supercategory 20.

Pursuant to the present invention, when an "attribute" is to be associated with a particular "category" (e.g., see leftmost category "Cat." 22 in FIG. 6) parallel tables need to be built for that category and for all of its direct and indirect sub-categories. Thus, assuming that in FIG. 6 an attribute ("Attr." 28) is assigned to the leftmost category 22 then the sub-categories 24 which depend therefrom must also be provided with memory tables ("Attr." 30 & 32) to hold values for that attribute. It should be noted that a "hierarchical" arrangement of the parallel tables is attained by so structuring the memory tables. Specifically, for each "attribute" associated with a particular "category" (defined by an attribute definition "AttrDef." 26) there exists a parallel table ("Attr." 28) and for each sub-category ("Cat." 24) to that category (i.e., leftmost "Cat." 22) there exists a separate parallel table ("Attr." 30 & 32) which contains the "attribute values" for that supercategory attribute. Note that each of these parallel tables is separate from the category to which it is associated. As described below, an array of pointers (referred to as an "attribute table") is associated with each "attribute definition" and is used to identify a particular parallel table within the hierarchical parallel tables structure containing the desired attribute values for the specific category. The array of pointers is indexed by the unique "level-relative index" for the subject category. Assignment of such "level-relative indices" is next discussed.

For each category "X" all of its direct and indirect sub-categories are preassigned indices that uniquely label each of them among the sub-categories of "X" If "X" is at level "K" then these indices are at level K relative to indices for each of these sub-categories. By way of example, FIGS. 7–10 show a set of level-relative index assignments for a sample category hierarchy 40.

Figure 7:
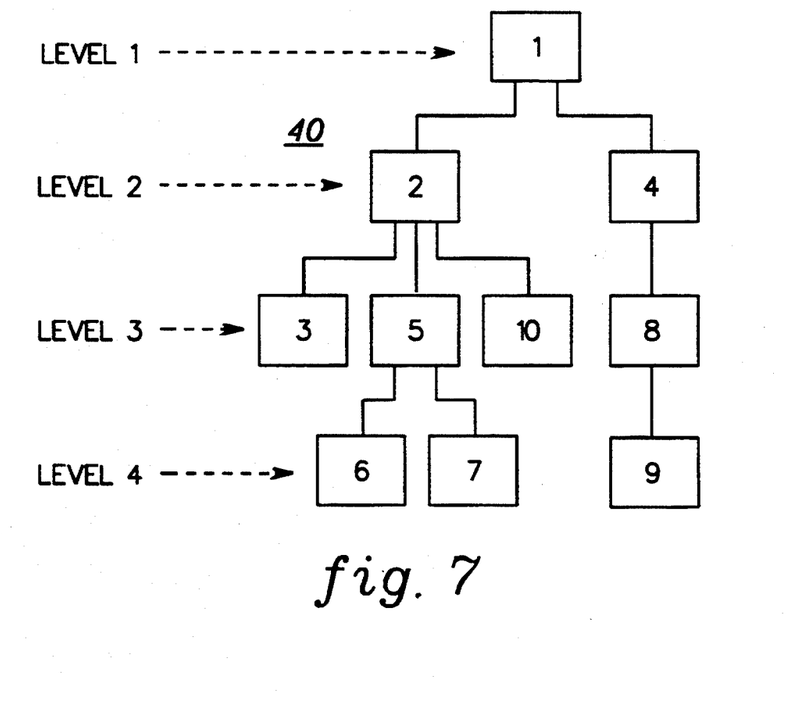
FIG. 7 is another example of a data model hierarchy, wherein first level-relative indices pursuant to the present invention have been arbitrarily assigned to the various categories.
Figure 8:
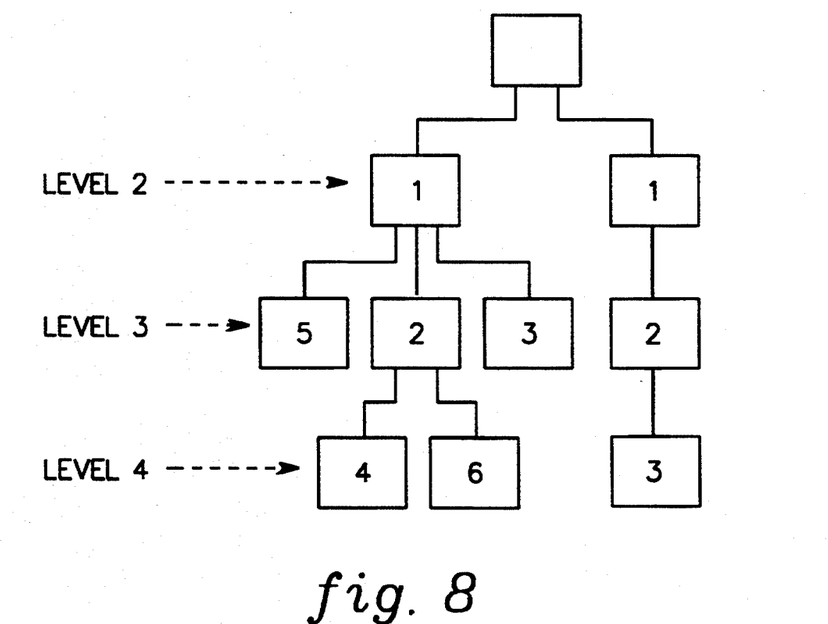
FIG. 8 depicts the arbitrary assignment of second level-relative indices pursuant to the present invention for the data model of FIG. 7.
Figure 9:
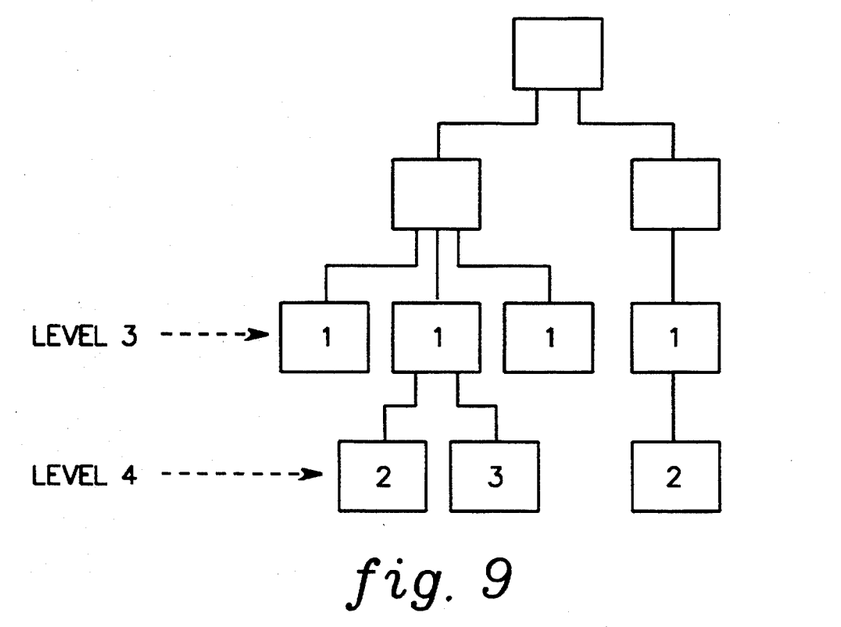
FIG. 9 depicts the arbitrary assignment of third level-relative indices pursuant to the present invention for the data model of FIGS. 7 & 8.
Figure 10:
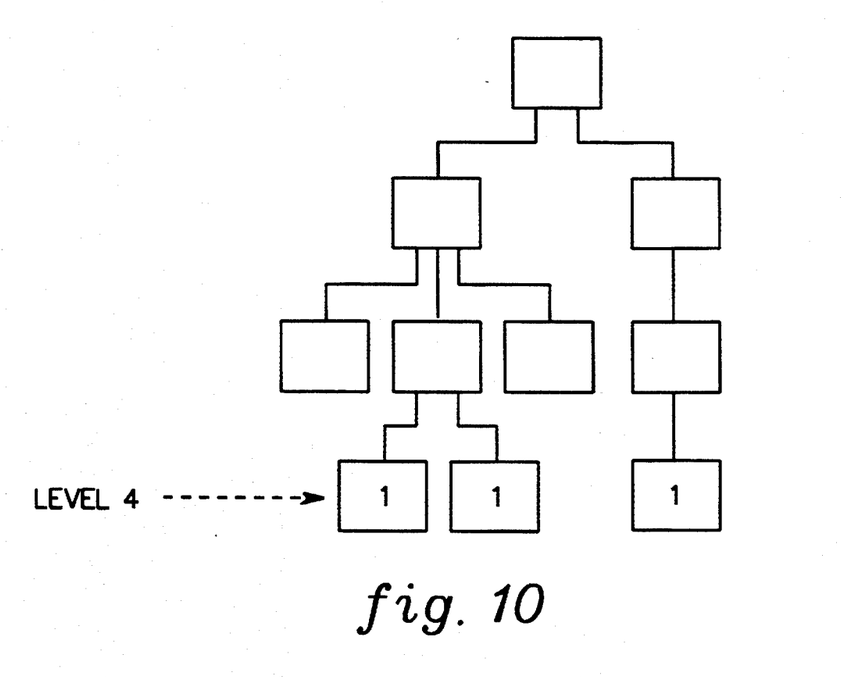
FIG. 10 depicts the arbitrary assignment of fourth level-relative indices pursuant to the present invention for the data model of FIGS. 7–9.

As shown, there are four levels to the category hierarchy 40. FIG. 7 depicts sample level-relative indices for "level 1" category attributes, FIG. 8 depicts sample level-relative indices for "level 2" category attributes, FIG. 9 depicts level-relative indices for "level 3" category attributes, and FIG. 10 depicts sample level-relative indices for "level 4" category attributes.

Again, assignment of indices is arbitrary within each level. The only rules are: (1) the "level K" relative indices of a category at "level K" and all of its direct and indirect sub-categories must be unique (i.e., no two of these "vertically connected" categories may share a "level K" relative index), for example, consider the level-relative indices assigned in FIG. 7, FIG. 8, FIG. 9 or FIG. 10; and (2) the indices assigned should be kept as dense as possible. If there are N categories in a set of categories which share a common level K supercategory, then the indices should be assigned in approximately the range 1 . . . N. However, the level-relative indices need not be completely dense.

With reference to FIG. 7, rule (1) means that each category at level 1, level 2 and level 3 will have a unique index (i.e., number) relative to those sub-categories which depend directly or indirectly therefrom. For example, since the ultimate supercategory is assigned index "1", none of the categories which depend therefrom may be assigned this index. This rule applies to assignment of level-relative indices for the "level 2" category attributes (FIG. 8), "level 3" category attributes (FIG. 9) and "level 4" category attributes (FIG. 10). Again, no category/sub-category combination may share the same level-relative index. With respect rule (2), the level-relative indices need not be completely dense, i.e., not every index in a range of indices need have a corresponding category. However, since the indices will be used to index into arrays, empty space should be minimized.

An attribute assignment mechanism pursuant to the present invention supports the following functions:

(1) Meta-Data Operations

These operations occur relatively infrequently. They include creating and destroying categories, and creating and destroying attributes (or attribute definitions). When creating a category at level K, a set of level-relative indices for "level 1" to "level K" must be generated. (These indices can be marked available for reuse when the category is destroyed.) When a category is created, a set of parallel tables must also be designated to hold the attribute values which are to be associated with objects in the new category. The locations of these new parallel tables must be added to the arrays in the "attribute definition" structures so that the tables can be found when the application needs access to an "attribute value" in one of the new parallel tables. (These tables should also be freed when the category is destroyed.) Again, an "attribute definition" (AttrDef.) is associated with each category. When an "attribute definition" is created, parallel tables must be associated with that category and all of its direct and indirect sub-categories. A location array for these parallel tables must be constructed and indexed by the level-relative indices of each of these categories. (All associated parallel tables are freed when an "attribute definition" is destroyed.)

(2) Working Date Operation

The majority of application processing focuses on these operations, and, obviously, highest performance efficiency is to be achieved. Typical operations include creating and destroying "objects" and manipulating "attribute values" for particular objects. (Examples include: (1) retrieval of an integer value; and (2) addition of a relationship between objects to an existing relation attribute.) Each "object" must have an index which is unique to its "category". These indices are assigned when the object is created and may be saved for reuse when the object is destroyed. As noted, there is a "parallel table" associated with each "category" for every "attribute" applicable to "objects" in that category. As new objects are created within a category, the parallel tables must occasionally be reallocated with a larger size so that table entries exist for all of the objects in the category. Conversely, when objects in the category are destroyed, tables may shrink. An index compaction mechanism may have to be introduced to maintain space efficiency. Accessing "attribute values" for objects is a key operation for any object-oriented data model. The structures and algorithms required to support such an operation in a hierarchical parallel tables implementation are explained in detail below.

Figure 11:
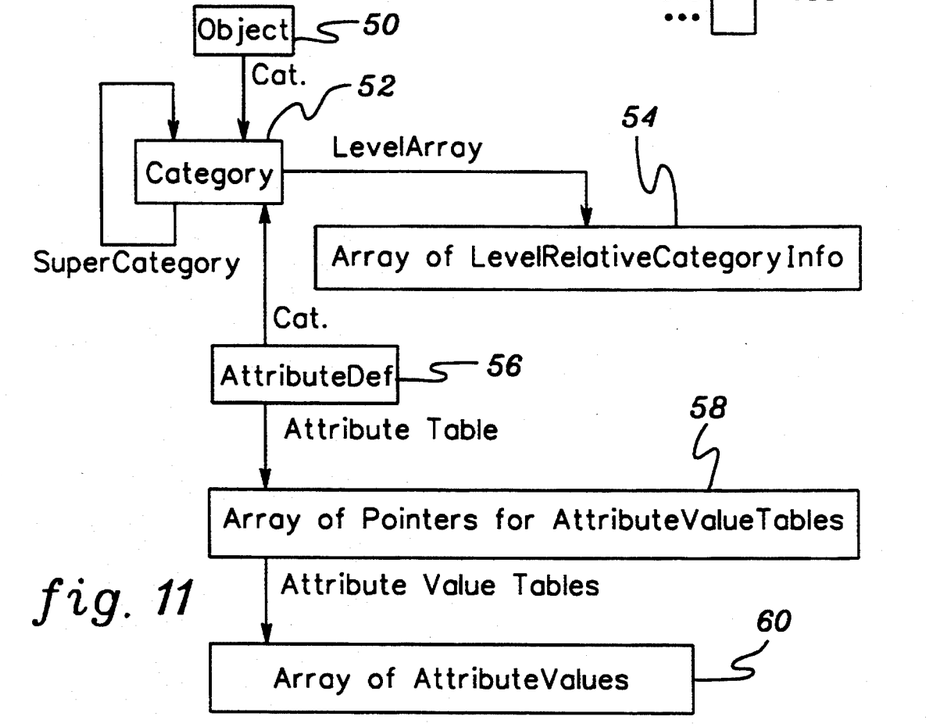
FIG. 11 depicts a sample schema for a hierarchical parallel tables data structure pursuant to the present invention.

First, a sample schema of the various structures pursuant to the present invention is depicted in FIG. 11. An object 50 is a member of a "Category" 52, which may have a "supercategory". Associated with category 52 is an "Array of LevelRelativeCategoryInfo", 54, which contains level array index information to the "Attribute Table" array. Also, an attribute definition ("AttributeDef" 56) is provided for each attribute of the subject category. Attribute definition 56 is associated with an array of pointers 58 "Array of AttributeValue Tables" (also referred to as the "Attribute Table"). Each pointer of the attribute table 58 addresses a particular parallel table. The array of parallel tables contains the specific attribute values, 60 "Array of AttributeValues." Again, specific pointers in attribute table 58 are indexed by the appropriate level-relative index of the level array 54.

A specific 'C' language programming example for retrieving attribute values using the above-outlined schema is next presented. As noted, an "object" structure is used to represent each actual data object which applications use to record working data. Applications create and destroy "instances" of an object structure, and set and retrieve "attribute values" for the various "objects." For example:

```
struct Object {
    Category *Cat;
    int Index;
}
```

Where: The phrase "Cat" refers to a pointer to the category of which the object is a member. When an attribute of the object is to be accessed, the object's category is used to find the appropriate parallel table containing the attribute value. The "index" for the object is unique within the object's category. This index is used to select the attribute value associated with the object from the identified parallel table associated with its category.

The "category" structure is a fundamental means by which applications construct the classification system for objects. For example:

```
struct Category {
    Category *SuperCategory;
    int Level;
    LevelRelativeCategoryInfo *LevelArray;
}
```

Where: The phrase "*SuperCategory" is a pointer to the supercategory of this category. "Level" counts how many levels down from the top of the category hierarchy the particular category is situated. As already noted, when the supercategory is null, the level is 1. "LevelArray" is a pointer which points to the array of information about how this category fits into each level of the category hierarchy. The integer level gives the number of entries in "LevelArray."

The "LevelRelativeCategoryInfo" structure defines the structure of each element in the level array associated with each category. This level array contains the level-relative indices, which eliminates wasted space in the arrays of pointers (Attribute Tables) to the parallel tables which hold the attribute values. The level array is indexed by a level number less than or equal to the category with which the level array is associated. The data in this structure is automatically derived by the category hierarchy information which is maintained by the instances of the category structure.

```
struct LevelRelativeCategoryInfo {
    Category *SuperCategory;
    int Index;
}
```

The "SuperCategory" for "LevelArray[K]" is the category found by starting with the category with which this level array is associated and following the category chain up the hierarchy until hierarchy level K is reached. "Index" refers to the preassigned indices to the categories. Again, all the categories that share the same K'th level supercategory are assigned unique level-relative indices which are stored at "LevelArray[K]" index. (See FIGS. 7–10 for an example of a set of level-relative index assignments.)

When an application needs to associate attributes with objects of a particular category, it constructs an instance of the "AttributeDef" structure to define the attribute and enable objects to maintain attribute values. For example:

```
struct AttributeDef {
    Category *Cat;
    AttributeValue **Tables;
}
```

Again, "Cat" records the category of the objects with which the attribute values are to be associated. Attribute values will be associated not only with objects of this particular category, but with all of its sub-categories as explained above in connection with the example depicted in FIGS. 7–10. "Tables" refers to the parallel table structures which are built to maintain the attribute values for the category with which this "AttributeDef" is associated, and for all of its sub-categories. An "Array of AttributeValues" table comprises an array of pointers which identify particular parallel tables holding the attribute values for one of the sub-categories. The K'th level-relative index of the sub-category, where K is the level of the category with which this "AttributeDef" is associated, is used to index into the table array.

The actual attribute values are maintained in the array of attribute values structure. For example:

```
struct AttributeValue {
    void* Value;
}
```

"AttributeValue" holds the actual attribute value. By way of example, the attribute value could comprise a raw pointer, however, any other type of value could also be used. Various mechanisms can be employed to support attributes of various types, but these mechanisms are considered independent of the invention disclosed herein.

By way of further example, one embodiment of a C++ language attribute value access routine pursuant to the present invention would comprise:

```
void* getAttributeValue(AttributeDef *ad, Object *s {
    LevelRelativeCategoryInfo *levelInfo;
    int attrLevel;
    int levelIndex;
    attrLevel = ad→Cat→Level;
    levelInfo = s→Cat→LevelArray;
    levelIndex = levelInfo[attrLevel].Index;
    if
        levelInfo[attrLevel].SuperCategory != ad→Cat
    then
        error( );
    else
        return ad→Tables[levelIndex] [s→Index]
}
```

The key statements in the above-presented routine are discussed below.

attrLevel=ad→Cat→Level;

First, the hierarchical level of the category with which the attribute definition is associated is determined. This category and all of its direct and indirect sub-categories have tables associated with them to maintain attribute values for this attribute definition.

levelInfo=s→Cat→LevelArray;

This instruction is to locate the level array associated with the actual category of the object for which an attribute value is sought.

levelIndex=levelInfo[attrLevel].Index;

A unique level-relative index is associated with each of the direct and indirect sub-categories of the category with which the attribute definition is associated. Here the level-relative index is found associated with the actual category of the object for which an attribute value is sought.

levelInfo[attrLevel].SuperCategory !=ad→Cat

In this step determination is made to verify that the AttrLevel'th supercategory of the object matches the category with which the attribute definition is associated. If these do not match, then the object and the attribute are incompatible.

```
return ad→Tables[levelIndex][s→Index]
```

The level-relative index of the object's category is used to find the proper parallel table which holds attribute values for that category. The object's category-specific index is then used to find the actual attribute value for that object.

Figure 13:
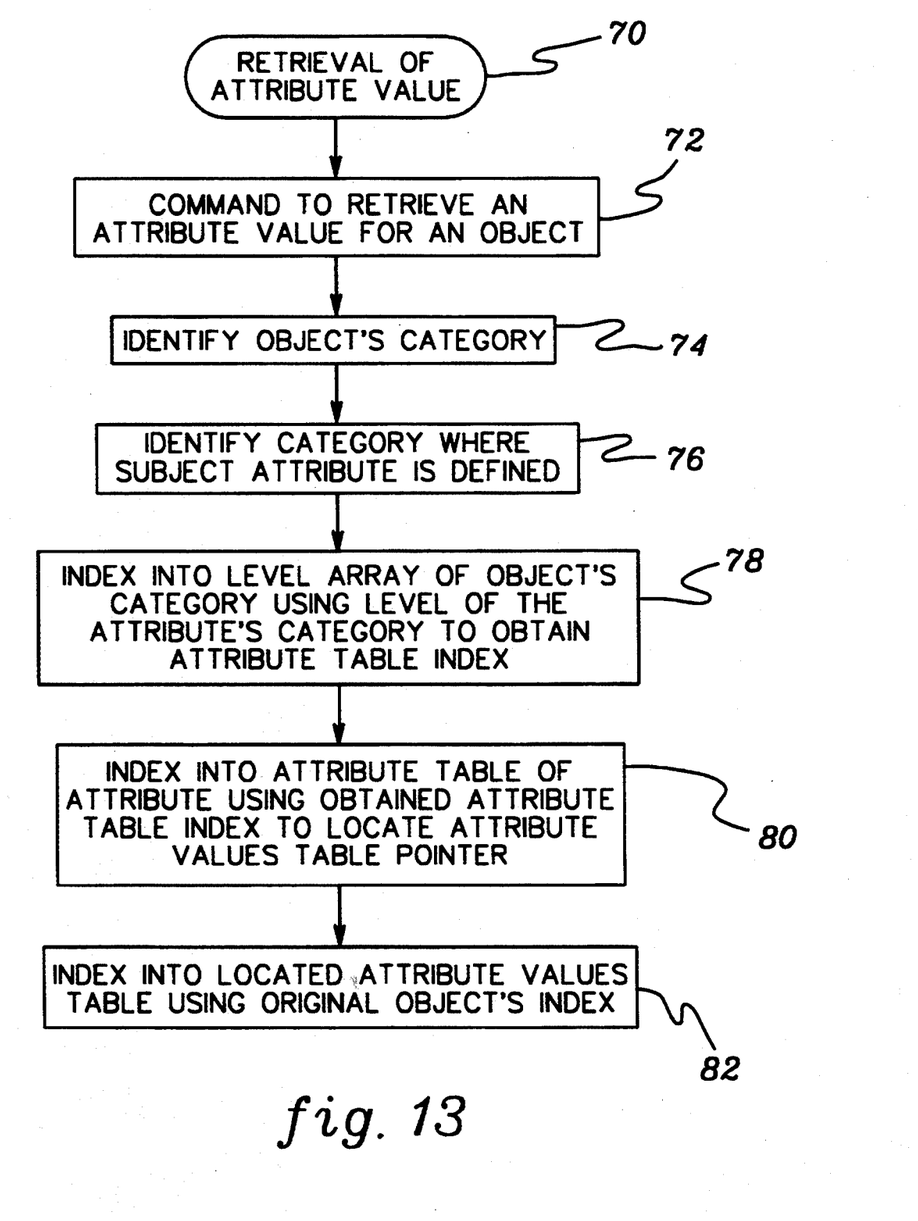
FIG. 13 depicts a specific example of accessing an attribute value pursuant to the present invention.

A generalized operational overview of a hierarchical parallel tables structure pursuant to the present invention is presented in FIG. 13. This figure depicts one embodiment for retrieving an attribute value employing such a structure. Processing begins, 70 "Retrieval Of Attribute Value," with a command to retrieve an attribute value for a particular object within a category, 72 "Command To Retrieve An Attribute Value For An Object."

The object's category is then identified, 74 "Identify Object's Category," along with the category where the attribute is defined, 76 "Identify Category Where Subject Attribute Is Defined." The level of the attribute's category is used to index into the level array of the object's category to obtain an attribute table index, 78 "Index Into Level Array Of Object's Category Using Level Of The Attribute's Category To Obtain Attribute Table Index." Once the attribute table index is attained, the corresponding pointer in the attribute table for the particular attribute is retrieved to identify the attribute values table of interest, 80 "Index Into Attribute Table of Attribute Using Obtained Attribute Table Index To Locate Attribute Values Table Pointer." Then the object's specific index is used to locate the attribute value within the identified table, 82 "Index Into Located Attribute Values Table Using Original Object's Index."

Figure 12:
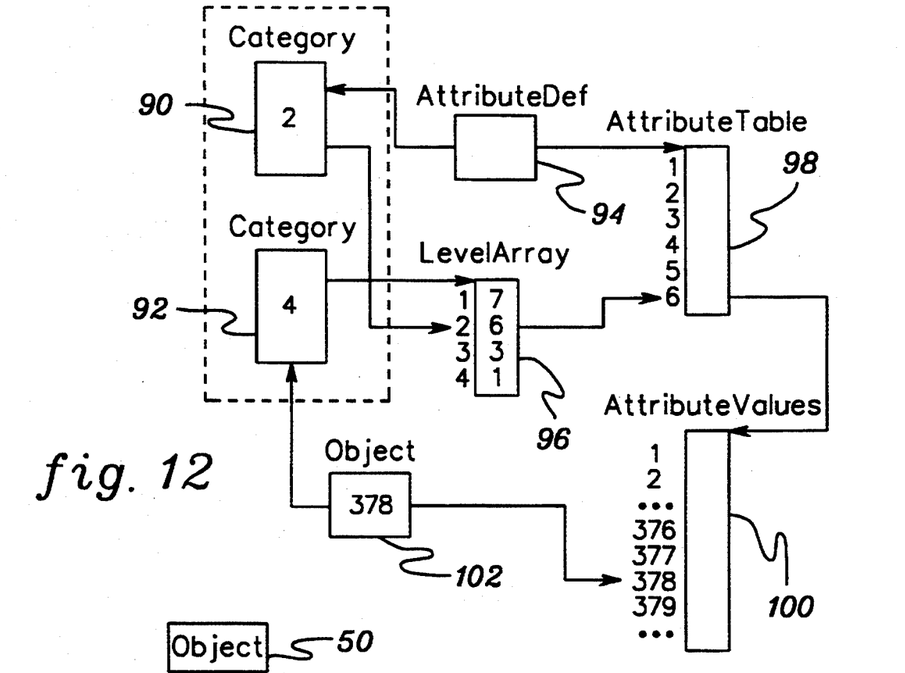
FIG. 12 is a processing flowchart of one embodiment for accessing an attribute value for an object-oriented data structure employing a parallel tables approach pursuant to the present invention.

In the specific example of FIG. 12, a supercategory 90 at "level 2" is assumed to have a sub-category 92 residing at "level 4" within the object-oriented model. An attribute is associated with supercategory 90 such that an "AttributeDef" 94 is established. It is further assumed in this example that an "attribute value" of the supercategory's attribute is desired for an object 102 located within sub-category 92 of supercategory 90. A level array 96 for category 92 contains the index to an attribute table 98 associated with AttributeDef 94. Attribute table 98 contains the pointer to the particular parallel table 100 of "attribute values" of interest. An object 102 within category 92 contains the particular index to the desired "attribute value" within parallel table 100.

The data structures and algorithms described herein provide a compact and fast dynamic attribute recording mechanism for an object-oriented environment. Attributes can be associated with any category and rapidly accessed for any object within that category or any of its direct or indirect sub-categories. The presented hierarchical parallel tables approach allows access to attribute values with a fixed, small number of instructions and improves efficiency by minimizing extra space in the various arrays. The technique is independent of the compiled object-oriented model and of the structure of the attribute values themselves. Further, attributes may be elementary primitive values, such as integers, or more complex structures, including even collections of relationships with other objects.

Although specific embodiments of the present invention have been illustrated in the accompanying drawings and described in the foregoing detailed description, it will be understood that the invention is not limited to the particular embodiments described herein, but is capable of numerous rearrangements, modifications and substitutions without departing from the scope of the invention. The following claims are intended to encompass all such modifications.

What is claimed is:

1. In a data processing system, a computer memory tables structure for an object-oriented data model having multiple categories arranged in a hierarchial structure wherein a supercategory is defined having a sub-category, said supercategory having an attribute associated therewith such that attribute values exist for said supercategory and for said sub-category, said computer memory tables structure comprising:

multiple computer memory tables separate from but associated with said multiple categories of said object-oriented data model, said multiple computer memory tables retaining said attribute values of said attribute associated with said supercategory, a first memory table being associated with said supercategory for retaining attribute values for said supercategory of said attribute and a second memory table being associated with said sub-category for retaining attribute values for said sub-category of said attribute associated with said supercategory; and a set of unique level-relative indices assigned to said supercategory and said sub-category for accessing said associated multiple computer memory tables, a first level-relative index of said set of level-relative indices being assigned to said supercategory for accessing said first memory table and a second level-relative index of said set of level-relative indices being assigned to said supercategory's sub-category for accessing said second memory table.

2. The computer memory tables structure of claim 1, wherein said supercategory has multiple sub-categories, each of said sub-categories having a separate memory table associated therewith for retaining attribute values for that sub-category of said attribute associated with said supercategory, and each of said sub-categories having a unique level-relative index assigned thereto for accessing its associated separate memory table retaining said attribute values for that sub-category of said attribute associated with said supercategory.

3. The computer memory tables structure of claim 2, wherein at least some of said supercategory's multiple sub-categories are arranged in multiple levels in the hierarchical structure of multiple categories.

4. The computer memory tables structure of claim 2, wherein said supercategory comprises a first supercategory and wherein said first supercategory is a sub-category of a second supercategory.

5. The computer memory tables structure of claim 1, wherein each of said multiple categories arranged in said hierarchial structure includes at least one object, each object having an index associated therewith to its category's associated memory table such that said object index of said sub-category identifies within said second memory table the location of a desired attribute value for said attribute associated with said supercategory.

6. The computer memory tables structure of claim 5, wherein multiple attributes are associated with said supercategory such that attribute values exist for each attribute for said supercategory and for said sub-category, and wherein multiple computer memory tables separate from but associated with said multiple categories are provided for retaining attribute values of each of said attributes associated with said supercategory, and wherein said unique level-relative indices are assigned to each of said supercategory and said sub-category for accessing the associated multiple memory tables for each attribute defined for said supercategory.

7. In a data processing system, a computer memory model for storing attribute values for an object-oriented data model having multiple categories arranged in a hierarchical structure wherein a supercategory is defined having a sub-category, said supercategory having an attribute associated therewith such that attribute values exist for said supercategory and for said sub-category, said computer memory model comprising:
- a first level array associated with said supercategory and a second level array associated with sub-category, said first and second level arrays each containing level-relative indices for said supercategory and said sub-category, respectively, said level-relative indices being arbitrarily assigned and unique for said attribute associated with said supercategory;
- a computer-implemented attribute table associated with said supercategory's attribute, said attribute table containing memory table pointers for said supercategory and said sub-category specific to said supercategory's attribute, said level-relative indices of said first and second level arrays including an index for said supercategory to said attribute table and an index for said sub-category to said attribute table; and
- multiple computer memory tables separate from but associated with said multiple categories, said memory table pointers contained in said attribute table associated with said supercategory's attribute identifying for each of said supercategory and said sub-category a specific computer memory table containing corresponding attribute values for said supercategory's attribute.

8. The computer memory model of claim 7, wherein each of said supercategory and said sub-category contain multiple objects, each of said objects having a unique index for accessing a corresponding attribute value from an identified specific computer memory table containing attribute values for said supercategory's attribute.

9. The computer memory model of claim 7, wherein multiple attributes are associated with said supercategory such that attribute values exist for said supercategory and for said sub-category for each of said supercategory attributes, said computer memory model further comprising multiple computer-implemented attribute tables, each attribute table being associated with one of said supercategory's multiple attributes and each attribute table containing memory table pointers for said supercategory and said sub-category specific to said associated supercategory's attribute, and wherein multiple memory tables are provided for each of said supercategory attributes, said memory table pointers contained in said attribute tables associated with supercategory's attributes identifying for each of said supercategory and said sub-category a specific computer memory table containing corresponding attribute values for each of said supercategory's attribute.

10. The computer memory model of claim 7, wherein said supercategory has multiple sub-categories, each of said sub-categories having a separate computer memory table associated therewith for retaining attribute values for that sub-category of said attribute associated with said supercategory, and each of said sub-categories having a unique level-relative index assigned thereto for accessing a corresponding one of said memory table pointers in said attribute table associated with said supercategory's attribute, said corresponding memory table pointer for each of said sub-categories identifying the specific computer memory table containing corresponding attribute values for said supercategory's attribute.

11. The computer memory model of claim 7, wherein said sub-category has an additional attribute associated therewith such that attribute values exist for said sub-category, said memory model further comprising:
- a unique level-relative index in said second level array for said additional attribute associated with said sub-category;
- an additional computer-implemented attribute table associated with said sub-category's attribute, said additional attribute table containing at least one memory table pointer for said sub-category specific to said sub-category's attribute, said unique level-relative index in said second level array for said additional attribute associated with said sub-category comprising an index into said additional attribute table; and
- said memory table pointer contained in said additional attribute table associated with said sub-category's attribute identifying for said sub-category a specific computer memory table containing corresponding attribute values for said sub-category's attribute.

12. A computer-implemented method for locating an attribute value table from a parallel table structure associated with a computer-implemented object-oriented data model having multiple categories arranged in a hierarchical structure wherein a supercategory is defined having a sub-category, said supercategory having an attribute associated therewith such that attribute values exist for said supercategory and for said sub-category, said parallel table structure including an attribute table for said supercategory's attribute and multiple computer memory tables separate from but associated with said object-oriented data model's multiple categories, said attribute table containing memory table pointers for said supercategory and said sub-category specific to said supercategory's attribute, a first level array being associated with said supercategory and a second level array being associated with said sub-category said first and second level arrays each containing level-relative indices for said supercategory and said sub-category, respectively, said level-relative indices being arbitrarily assigned and unique for said attribute associated with said supercategory, said attribute value table locating method for locating an attribute value table for said sub-category of said attribute associated with said supercategory, said computer-implemented method comprising the steps of:
- (a) referencing said second level array associated with said sub-category to identify an assigned level-relative index for said sub-category for said attribute associated with said supercategory;
- (b) indexing into said attribute table associated with said supercategory's attribute to locate a memory table pointer, said indexing step employing said level-relative index identified in step (a) for said sub-category; and (c) using the memory table pointer located in said attribute table in said step (b) to identify a corresponding one of said multiple computer memory tables containing attribute values for said sub-category of said attribute associated with said supercategory, said corresponding one of said multiple computer memory tables comprising the attribute value table for said sub-category of said attribute associated with said supercategory.

13. The computer-implemented method of claim 12 wherein said supercategory's attribute has a level associated therewith and wherein said referencing step (a) includes indexing into said second level array using the level of said supercategory's attribute to obtain said level-relative index to said attribute table associated with said supercategory attribute.

14. The computer-implemented method of claim 12, wherein an object of said sub-category includes an index and wherein said method further includes employing said object index to locate a desired attribute value for said sub-category of said attribute associated with said supercategory once said corresponding one of said multiple computer memory tables is located.

* * * * *